United States Patent
Komuro et al.

[11] Patent Number: 5,991,307
[45] Date of Patent: Nov. 23, 1999

[54] METHOD AND APPARATUS FOR PACKET TRANSMISSION

[75] Inventors: Teruyoshi Komuro; Takehiko Nakano, both of Kanagawa, Japan

[73] Assignee: Sony Corporation, Tokyo, Japan

[21] Appl. No.: 08/827,525

[22] Filed: Mar. 28, 1997

[30] Foreign Application Priority Data

Apr. 5, 1996 [JP] Japan ..................................... 8-110053

[51] Int. Cl.[6] ....................................................... H04J 3/24
[52] U.S. Cl. ........................... 370/473; 370/304; 370/324
[58] Field of Search ..................... 370/473, 304, 370/324, 336, 345, 350, 512, 513, 514, 520; 375/220, 295, 316, 354, 355, 356, 359, 362, 363, 364, 365, 368; 455/39, 502, 85, 86, 220

*Primary Examiner*—Dang Ton
*Assistant Examiner*—Phirin Sam
*Attorney, Agent, or Firm*—Frommer Lawrence & Haug, LLP.; William S. Frommer

[57] ABSTRACT

In transmitting a packet string having variable packet intervals by converting the packet string into that having even packet intervals with each of the packets being attached with a time stamp as information for reproducing original packet string, when the value of the time stamp, which is decided by adding a specified offset time to the synchronization time, is not smaller than the value of the time stamp attached to the previous packet, the time stamp is attached to the packet and the packet is transmitted. If the value of the time stamp becomes not more than the value of the time stamp attached to the previous packet as a result of providing shortened offset time due to increased bit rate of the original packet string, the packet is discarded so as to protect the transmission from being stopped.

16 Claims, 7 Drawing Sheets

METHOD AND APPARATUS FOR PACKET TRANSMISSION

BACKGROUND OF THE INVENTION

The present invention relates to a method and an apparatus for transmitting a packet string having variable packet intervals by converting the packet string to a packet string having even packet intervals with information for reproducing the original packet intervals being attached, more particularly to a method of continuing communications without stopping even when a bit rate becomes higher, that is, when packet intervals become shorter.

When an attempt is made to transmit a packet string in which packets are arranged at variable intervals, that is, a packet string whose bit rate changes, it is indispensable to prepare a data bus provided with a capacity corresponding to the maximum bit rate. Compared with a capacity necessary for transmission at an average bit rate, this makes the bus capacity redundant.

To avoid such a redundancy, a method is proposed in which packets are stored in a buffer (hereinafter referred to as a smoothing buffer) once, then the packets are read out at a fixed rate (hereinafter referred to as a leak rate) and transmitted at a fixed leak rate so as not to require a redundant transmission bus. At this time, however, if packets are transmitted via a smoothing buffer, original packet intervals become unknown. As a result, the original packet intervals cannot be reproduced on the receiving side. To avoid this, interval information is added to each packet so that the original packet intervals can be reproduced in the receiver.

Figure 1A:
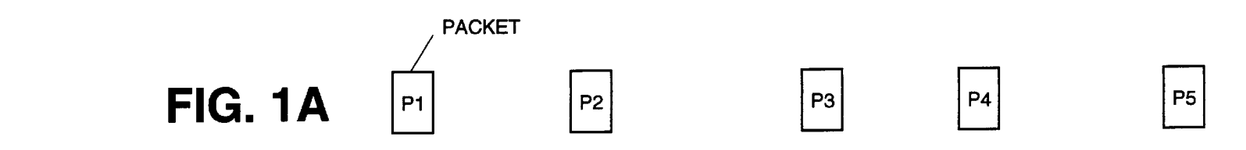
FIG. 1A through FIG. 1D show packet strings forming a timing chart in the packet reproducing method in the related art.
Figure 1B:
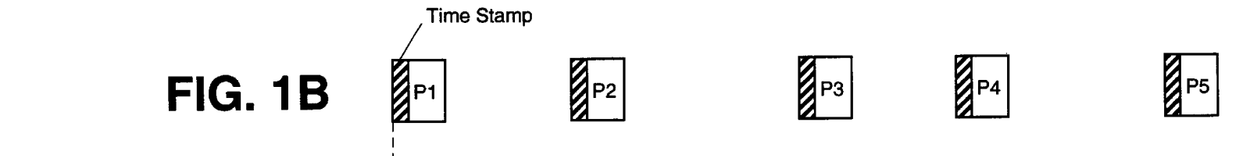
Figures 1C, 1D:
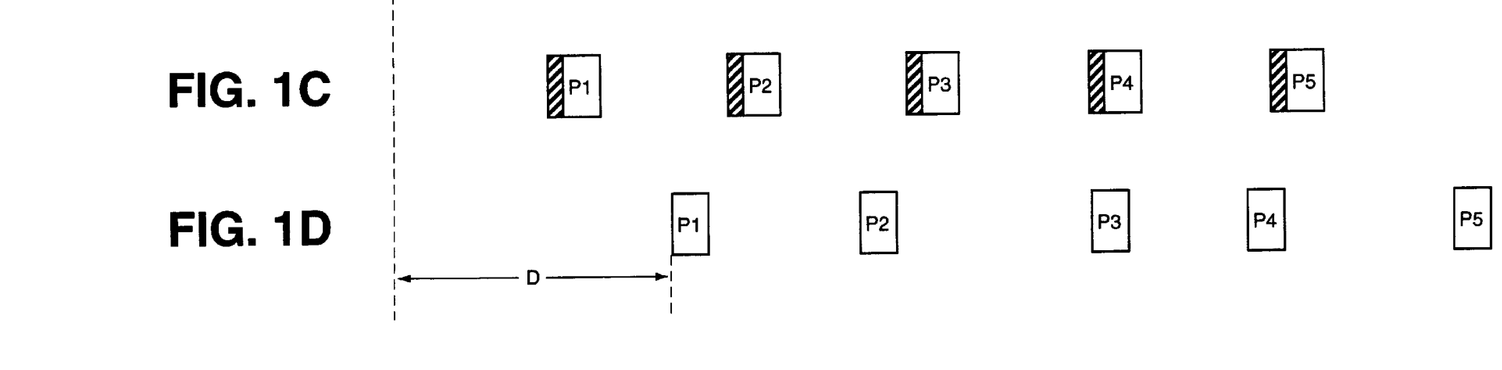

Packet intervals are reproduced as described below. At first, synchronized clocks are started on both transmitting side and receiving side. Then on the transmitting side, the time when the leading edge of a packet is detected at the inlet of the smoothing buffer is stored and a time stamp of a value T decided by adding a specified offset time D to the detected time is attached to the packet before the packet is transmitted. On the receiving side, each received packet is stored in a receiving buffer once and the value T of the time stamp is fetched from the packet. The packet is read out from the receiving buffer when the clock value becomes equal to T to reproduce the original packet interval. FIG. 1A shows a discrete packet string whose average bit rate is A, FIG. 1B shows a discrete packet string to each packet of which a time stamp is attached at the inlet of the smoothing buffer, FIG. C shows a periodical packet string read out from the smoothing buffer and having a leak rate B, and FIG. 1D shows a packet string read out from the receiving buffer and for which the original packet intervals are reproduced.

In the above described method, no problem arises as long as the average bit rate A remained constant. However, when an average bit rate becomes higher, arises the following problems.

If, when the smoothing buffer size is fixed, the bit rate A becomes higher, then the leak rate must be set higher in order to prevent the buffer from overflowing. Thus, the transmission rate must also be raised, and accordingly the total time required for transmitting packets is shortened. Consequently, the above described offset time D must also be set smaller.

If a smaller offset time D is set, however, there is a possibility that the time stamp value calculated by using the smaller offset value becomes less than the value of the time stamp attached to the previous packet. If such an inversion occurs in the time stamp value, the communication is stopped. This is because the time for reproducing the packet attached with the time stamp having the smaller offset value has already lapsed on the receiving side when the previous packet is reproduced.

It is an object of the present invention to solve such problems by providing each packet string having variable packet intervals with information for reproducing original packet intervals so that the packet string can be transmitted continuously, which is converted to a packet string having even packet intervals, even when the bit rate becomes higher.

SUMMARY OF THE INVENTION

In order to accomplish the above object, the present invention provides a method of transmitting and receiving a packet string with various packet intervals wherein an original packet string as the packet string with various packet intervals is transmitted from a transmitting side after being converted into a packet string with substantially fixed packet intervals, which comprises the steps of:

calculating a time stamp as a current time stamp for the current packet by adding a specified offset time to the current time at which the current packet has appeared;

reading out a value of a time stamp for a previous packet having been stored as a value of a previous time stamp;

comparing a value of the current time stamp with the value of the previous time stamp;

updating the value of the previous time stamp having been stored with the value of the current time stamp and attaching the current time stamp to the current packet if the value of the current time stamp is more than the value of the previous time stamp;

discarding a predetermined packet if the value of the current time stamp is not more than the value of the previous time stamp;

storing the current packet attached with the current time stamp if the current packet is not discarded;

adjusting a timing of the current packet attached with the current time stamp so that the packet forms the packet string with substantially fixed packet intervals; and transmitting the packet string with substantially fixed packet intervals.

The present invention also provides a method of transmitting and receiving a packet string with various packet intervals wherein an original packet string as the packet string with various packet intervals is transmitted from a transmitting side after being converted into a packet string with substantially fixed packet intervals and is received at a receiving side, which comprises the steps of:

determining a current time at which a packet in the original packet string has appeared as a current packet by using the clock signal on the transmitting side;

calculating a time stamp as a current time stamp for the current packet by adding a specified offset time to the current time at which the current packet has appeared;

reading out a value of a time stamp for previous packet having been stored as a value of a previous time stamp;

comparing a value of the current time stamp with the value of the previous time stamp;

updating the value of the previous time stamp having been stored with the value of the current time stamp and attaching the current time stamp to the current packet if the value of the current time stamp is more than the value of the previous time stamp;

discarding a predetermined packet if the value of the current time stamp is not more than the value of the previous time stamp;

storing the current packet attached with the current time stamp if the current packet is not discarded;

adjusting a timing of the current packet attached with the current time stamp so that the packet forms the packet string with substantially fixed packet intervals;

transmitting the packet string with substantially fixed packed intervals;

receiving the packet string with substantially fixed packet intervals at the receiving side;

storing the packet string with substantially fixed packet intervals having been received; and reading out the stored packet string with packet intervals according to the time stamps attached to the packets thereby reproducing the original packet string with variable packet intervals.

In both of the above methods, the predetermined packet may be the current packet, a previously stored packet having a larger value of time stamp than the value of the current time stamp, or a previously stored packet except for one which is read out and being transmitted.

The above object is also accomplished by an apparatus for transmitting a packet string with various packet intervals wherein an original packet string as the packet string with various packet intervals is transmitted from a transmitting side after being converted into a packet string with substantially fixed packed interval, which comprises:

a unit for calculating a time stamp as a current time stamp for the current packet by adding a specified offset time to the current time at which the current packet has appeared;

a reading out unit for reading out a value of a time stamp for pervious packet having been stored as a value of a previous time stamp;

a comparing unit for comparing a value of the current time stamp with the value of the previous time stamp;

an updating unit for updating the value of the previous time stamp having been stored with the value of the current time stamp and attaching the current time stamp to the current packet if the value of the current time stamp is more than the value of the pervious time stamp;

a discarding unit for discarding a predetermined packet if the value of the current time stamp is not more than the value of the previous time stamp;

a storing unit for storing the current packet attached with the current time stamp if the current packet is not discarded;

an adjusting unit for adjusting a timing of the current packet attached with the current time stamp so that the packet forms the packet string with substantially fixed packet intervals;

a transmitting unit for transmitting the packet string with substantially fixed packet intervals.

Here, the predetermined packet may be the current packet, a previously stored packet having a larger value of time stamp than the value of the current time stamp, or a previously stored packet except for one which is read out and being transmitted.

According to the method and apparatus of the present invention, the value of the time stamp attached each transmitted packet never becomes less than the value of the time stamp attached to the previously transmitted packet.

On the receiver side, each of received packets is stored in a buffer once and read out at the time indicated by the time stamp attached to the packet to reproduce the packet intervals for the original packet string.

DETAILED DESCRIPTION OF THE PREFERRED EMBODIMENTS

Embodiments

Figure 2:
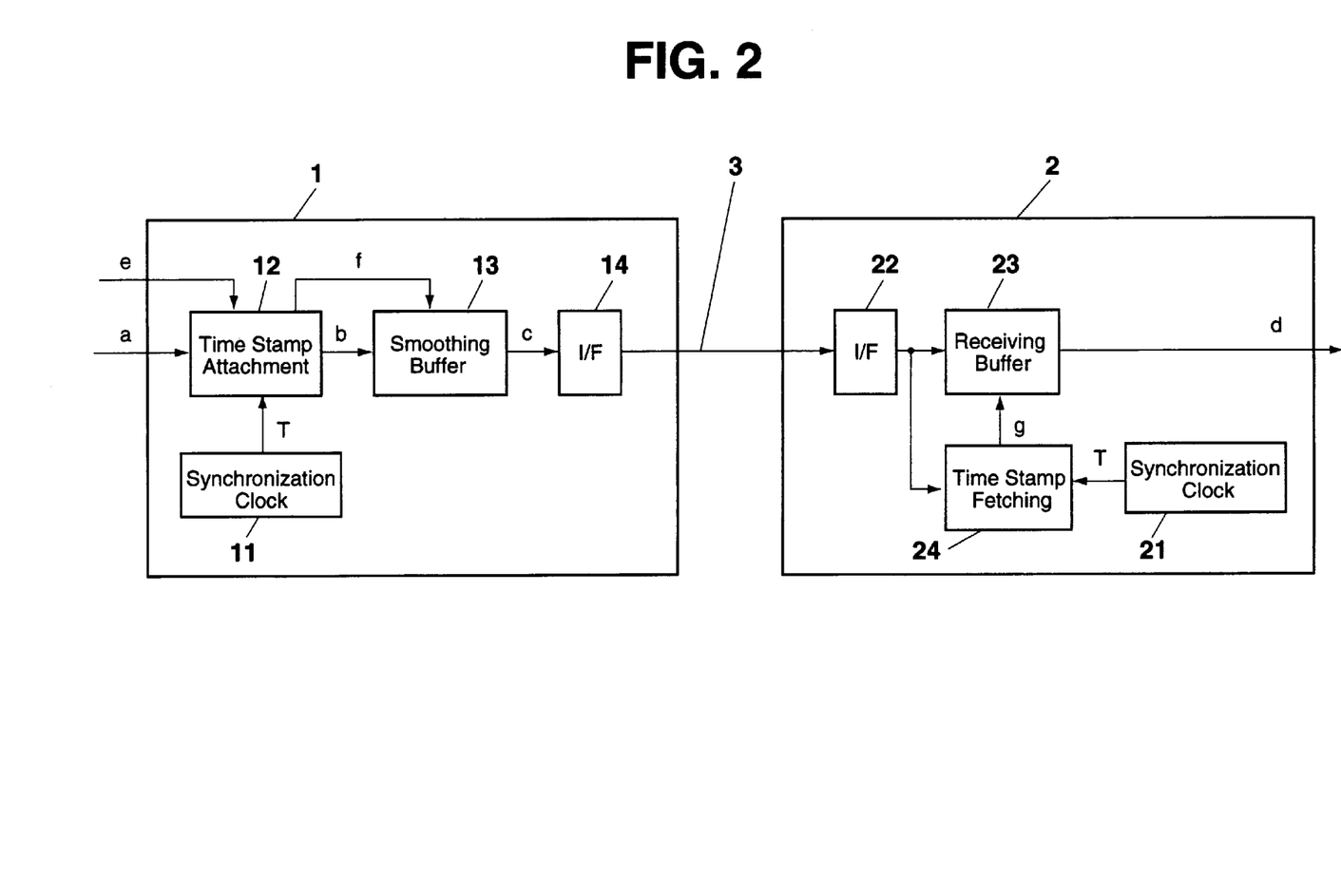
FIG. 2 is a block diagram showing a communication system according to the present invention.

Hereunder, embodiments of this invention will be described in detail with reference to the attached drawings. FIG. 2 shows a communication system according to the present invention. As shown in FIG. 2, the communication system comprises a transmitter 1, a receiver 2, and a communication control bus 3 used for connecting them.

The transmitter 1 is inputted with signals respectively having a fixed bit rate A on average such as packets of DVB (Digital Video Broadcasting) video data in which bit rate of compressed data varies for each program and scene, and converts them to packets having a fixed leak rate B respectively before the packets are outputted to the communication control bus 3. The receiver 2 is, for example, a digital video tape recorder used for recording data received via the communication control bus 3. The communication control bus 3 may be an IEEE1394 high performance serial bus (hereinafter referred to as IEEE1394 serial bus), for example.

The transmitter 1 is also provided with a synchronization clock 11, a time stamp attaching block 12 used for attaching a value, for which a specified offset time is added to the current time from the synchronization clock 11 to the input packet string a, a smoothing buffer 13 used for being input with a packet string b attached with time stamps and outputting a periodical packet string c whose leak rate is B, and a communication interface 14 used for transmitting the output from the smoothing buffer 13 to the communication control bus 3.

The synchronization clock 11 is operated in synchronism with the synchronization clock 21 provided in the receiver 2 (to be described later). The synchronization between the clocks 11 and 21 is realized by adjusting the time of both the clocks 11 and 21 to the synchronization time signal added to a cycle start packet flowing periodically, for example, on the IEEE1394 serial bus.

The time stamp adding block 12 stores the synchronization time T of the synchronization clock at the leading edge of each packet in the packet string a whose average bit rate is A, then attaches a time stamp to each packet. The time stamp indicates a time obtained by adding a specified offset time D to the synchronization time T. At this time, if the current bit rate e becomes higher, an offset time smaller than D is set for δ, and a control signal f is given to the smoothing buffer 13. (The details will be described later.)

The smoothing buffer 13 adopts an FIFO (First-In First-Out) structure. When the average bit rate A of input data is remained unchanged, the timing of reading out the packet string b to be written is adjusted to convert the packet string b to a periodical packet string c whose leak rate is B. If the average bit rate A of input data becomes high, necessary processing such as packet discarding is carried out. (The details will be described later.)

The communication interface 14 carries out encoding of transmission codes for the packet string c output from the smoothing buffer 13 and outputs the encoded codes to the communication control bus 3.

The receiver 2 is provided with a synchronization clock 21, a communication interface 22 allowing data from the communication control bus 3 to be input, a receiving buffer 23 for temporarily storing the packet string transmitted from the communication interface 22, and a time stamp fetching block 24 used for fetching the time stamp from each packet in the packet string transmitted from the communication interface 22, and comparing the time stamp with the synchronization time T of the synchronization clock 21 to supply the control signal g to the receiving buffer 23.

The synchronization clock 21 is operated in synchronism with the synchronization clock 11 provided in the transmitter 1 as described above.

The communication interface 22 executes proceedings including decoding of transmission codes in the data entered from the communication control bus 3.

The receiving buffer 23 stores the packet string transmitted from the communication interface 22 and reads out the stored packet string according to the control signal g supplied from the time stamp fetching block 24 to output a packet string d as the original discrete packet string.

The time stamp fetching block 24 compares the time stamp of each packet fetched from the packet string transmitted from the communication interface 22 with the synchronization time T outputted from the synchronization clock 11, and outputs a control signal g to the receiving buffer 23 when the time stamp value matches with the time T.

Subsequently, the overall operation of the communication system shown in FIG. 2 will be described, especially focusing on the proceedings executed by the time stamp adding block 12 and the smoothing buffer 13 provided in the transmitter 1. In this section, the three processing methods to apply to the proceedings in the above apparatuses 12 and 13 will be described sequentially.

(First Processing Method)

Figure 3:
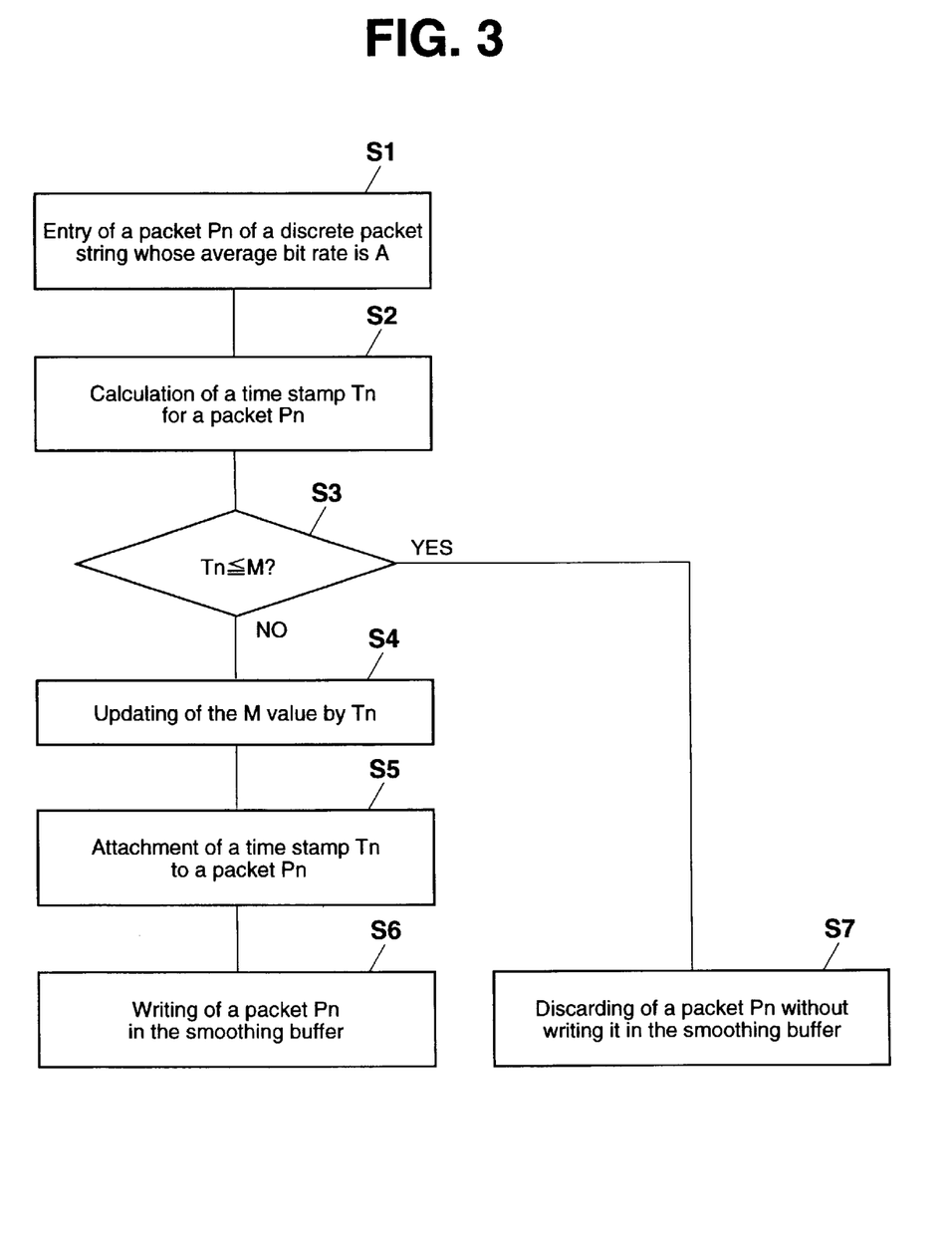
FIG. 3 is a flow chart showing the first processing method at the time stamp adding block and the smoothing buffer provided in a transmitter.
Figure 4A:
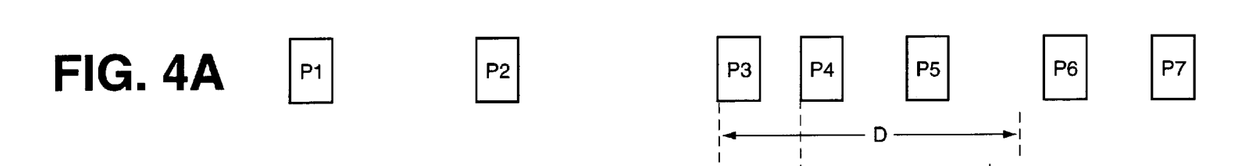
FIG. 4A through FIG. 4D show packet strings forming a timing chart in the first processing method.
Figure 4B:
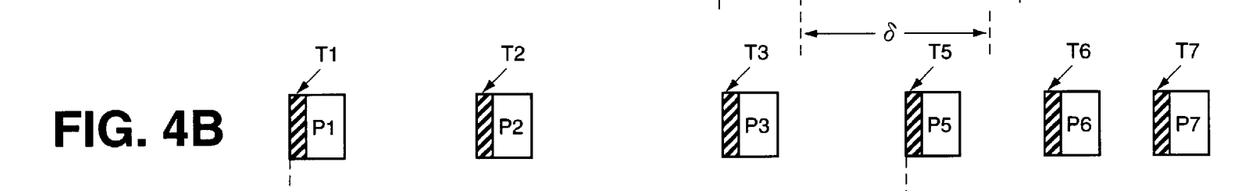
Figure 4C:
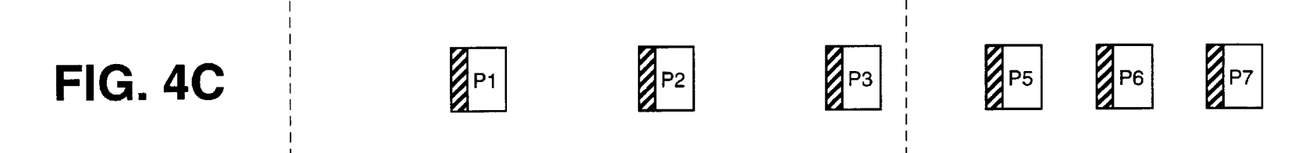
Figure 4D:
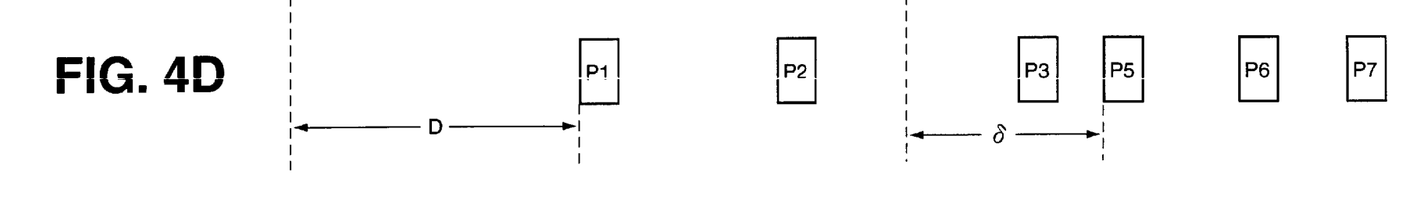

FIG. 3 shows a flow chart of the first processing method. FIG. 4A through FIG. 4D are packet strings forming a timing chart. In FIG. 4A shows a discrete packet string whose average bit rate is A, FIG. 4B shows a discrete packet string to each packet of which a time stamp is attached at the input of the smoothing buffer, and FIG. 4C shows a periodical packet string read out from the smoothing buffer with a leak rate B. FIG. 4D shows a packet string read out from the receiving buffer. The packets in this string are arranged at original intervals.

At first, a packet Pn (n=1, 2, 3 . . . ) in a discrete packet string whose average bit rate is A as shown in FIG. 4A is input to the time stamp adding block 12 (step S1 in FIG. 3).

The time stamp adding block 12 calculates the time stamp Tn obtained by adding a specified offset time to the current synchronization time of the synchronization clock 11 (step S2). After this, the time stamp Tn is compared with the time stamp M added to the previous packet (step S3). The initial value of M is taken to be 0.

If Tn is more than M as a result of the comparison, the M value is updated by Tn (step S4), then a time stamp Tn is attached to a packet Pn (step S5). Furthermore, the packet Pn is written in the smoothing buffer 13 (step S6). If Tn is not more than M as a result of the comparison, a time stamp inversion has occurred, so that the packet Pn is discarded without being written in the smoothing buffer 13 (step S7).

For example, packets P1 to P3 in FIG. 4A are attached with time stamps T1 to T3 without any measure since their values are not inverted each other when decided by adding the offset time D to the synchronization time T. However, the average rate of the packet string becomes higher from packet P4, so that the offset time used for calculating the time stamps for packet 4 and after is changed from D to δ (δ<D). As a result, the value of the time stamp T4 to be attached to the packet P4 becomes less than that of the time stamp T3 attached to the packet T3. If the packet string is transmitted with this inversion being remained, the communication is stopped from the packet P4. To avoid this, the packet P4 is discarded as shown in FIG. 4B.

As a result, the packet string output from the smoothing buffer 13 becomes as shown in FIG. 4C. Each packet in this packet string is stored in the receiving buffer 23 provided in the receiver and read out from the receiving buffer 23 with a timing at which the value of the synchronization clock 21 becomes equal to the time stamp. Consequently, the packet string d output from the receiving buffer 23 allows the communication to be continued on, although the packet P4 is lost from the packet string.

(Second Processing Method)

Figure 5:
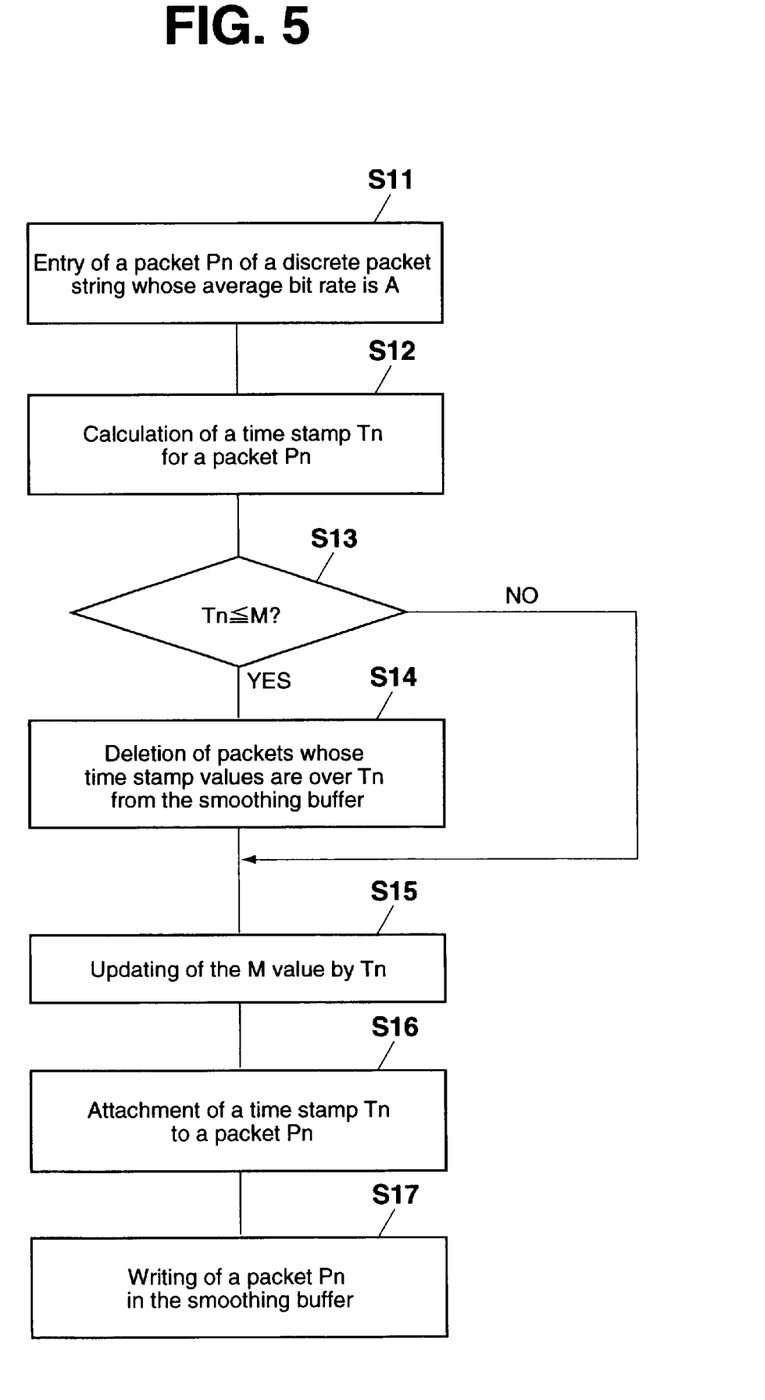
FIG. 5 is a flow chart showing the second processing method at the time stamp adding block and the smoothing buffer provided in a transmitter.

FIG. 5 shows a flow chart of the second processing method. FIG. 6A through FIG. 6D show packet strings forming a timing chart. In FIG. 6A through FIG. 6D, the same numerals are given to the same items as those in FIG. 4A through FIG. 4D.

Figure 6A:
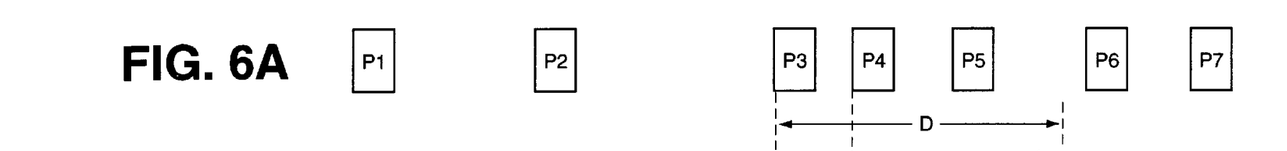
FIG. 6A through FIG. 6D show packet strings forming a timing chart in the second processing method.

At first, a packet Pn (n=1, 2, 3, . . . ) in a discrete packet string whose average bit rate is A as shown in FIG. 6A is input to the time stamp adding block 12 (step S1 in FIG. 5).

The time stamp attaching block 12 calculates the time stamp Tn obtained by adding a specified offset time to the current synchronization time of the synchronization clock 11 (step S12). After this, the time stamp Tn is compared with the time stamp M attaching to the previous packet (step S3).

If Tn is more than M as a result of the comparison, the M value is updated by Tn (step S15), then a time stamp Tn is attached to a packet Pn (step S16). Furthermore, the packet Pn is written in the smoothing buffer 13 (step S16). These proceedings are the same as those of the above first method.

If Tn is not more than M as a result of the comparison, an inversion has occurred in the time stamp. So, of the packets stored in the smoothing buffer 13, packets with time stamps large than Tn are deleted form the smoothing buffer 13 (step S14), then the process goes to step S15. The processing in this step S14 avoids inversion of time stamps in the packet string read out from the smoothing buffer 13.

Figure 6B:
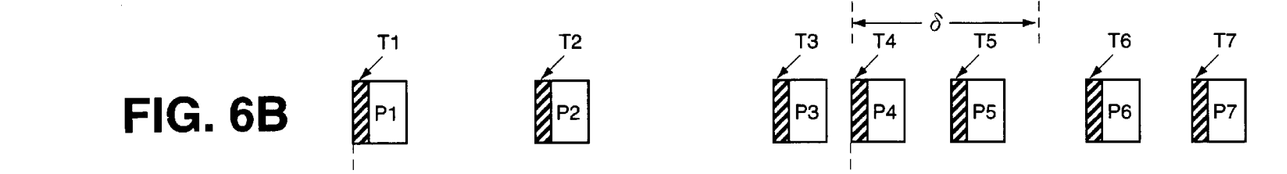

For example, packets P1 to P3 in FIG. 6B are attached with time stamps T1 to T3 without any measure since their values are not inverted each other when decided by adding the offset time D to the synchronization time T. However, the average rate of the packet string becomes higher from packet P4, so that the offset time used for calculating the time stamps for packet 4 and after is changed from D to δ (δ<D). As a result, the value of the time stamp T4 to be attached to the packet P4 becomes less than that of the time stamp T3 attached to the packet T3. If the packet string is transmitted with this inversion being remained, the communication is topped from the packet P4. To avoid this, the packet P3 stored in the smoothing buffer 13 is discarded.

As a result, the packet string output from the smoothing buffer 13 becomes as shown in FIG. 5C. Each packet in this packet string is stored in the receiving buffer 23 provided in the receiver and read out from the receiving buffer 23 with a timing at which the value of the synchronization clock 21 becomes equal to that of the time stamp. Consequently, the packet string d output from the receiving buffer 23 allows the communication to be continued on, although the packet P3 is lost from the packet string.

(Third Processing Method)

Figure 6C:
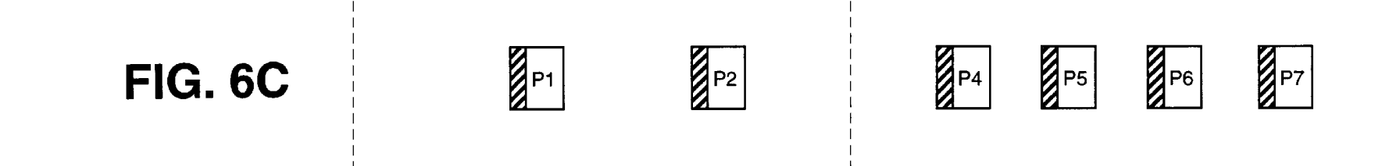
Figure 6D:
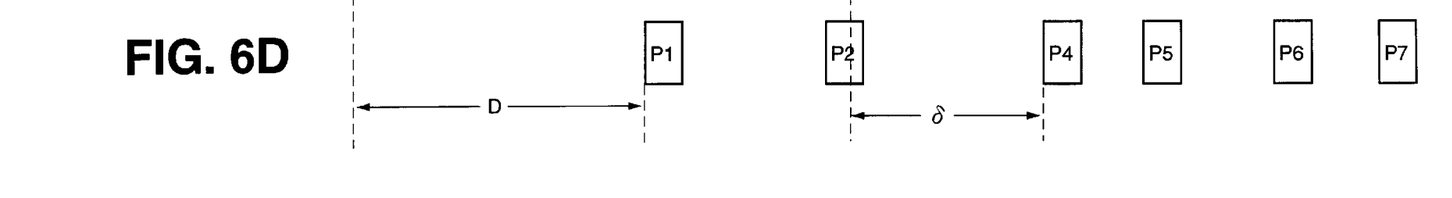
Figure 7:
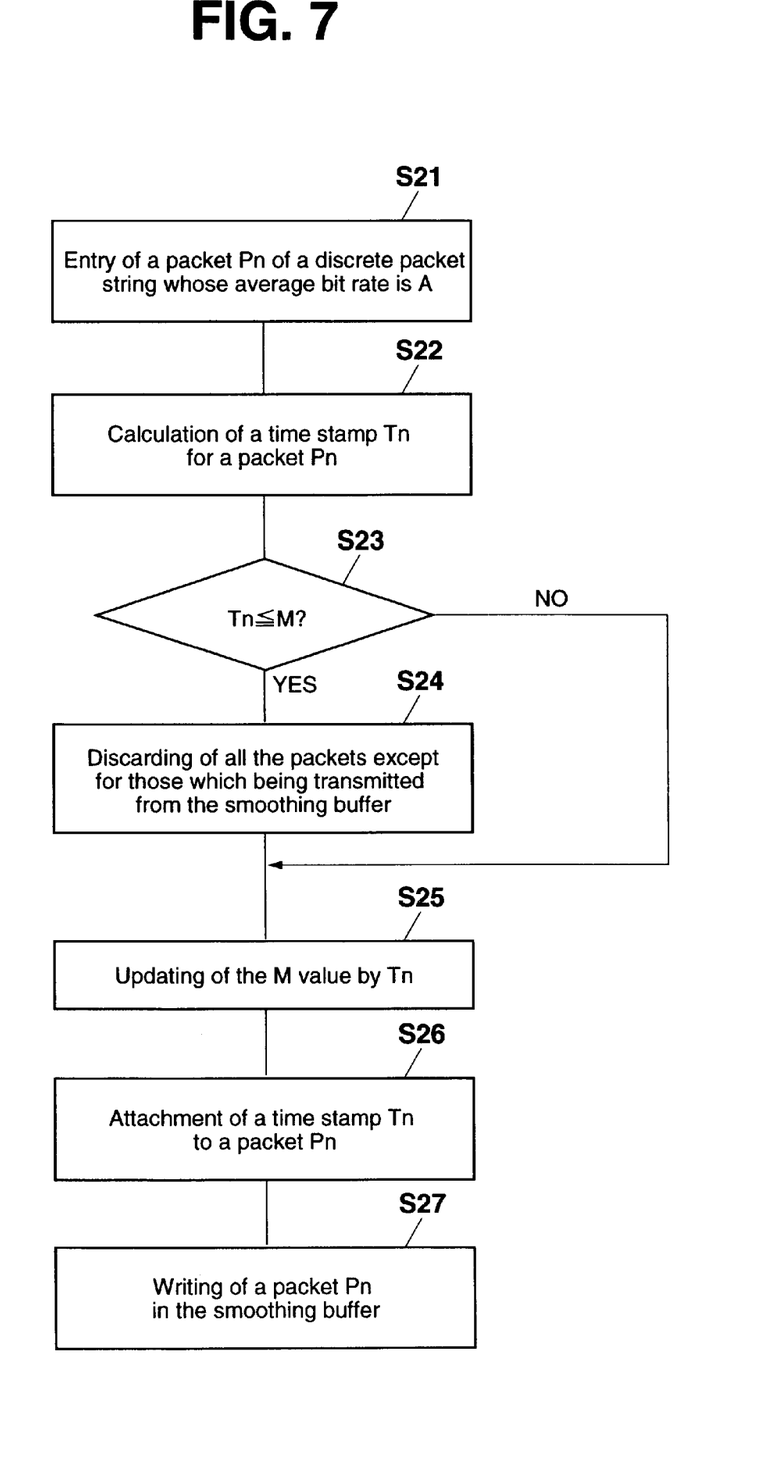
FIG. 7 is a flow chart showing the third processing method at the time stamp adding block and the smoothing buffer provided in a transmitter.

FIG. 7 shows a flow chart of the third processing method. No timing chart is exhibited here, since packet strings in this processing method form the same timing chart as that shown in FIG. 6A through FIG. 6D. This third processing method is the same as the second processing method except for step S24, so only step S24 will be described here for avoiding redundant explanation.

If the time stamp Tn attached to the packet Pn is equal to M or under, packets already stored in the smoothing buffer 13 are discarded except for those being transmitted in step S24. This processing avoids inversion of time stamps in the packet string read out from the smoothing buffer 13.

In FIG. 6A, for example, the time stamp offset value remains D for up to packet P3, but it becomes δ for packet P4 and after. If the timing for deciding a time stamp is assumed to be when the leading edge of the packet P4 reaches the time stamp attaching block 12, the packets P1 and P2 in the packet string shown in FIG. 6C are already output to the communication control bus 3 before the leading edge of the packet P4 shown in FIG. 6A reaches the time stamp attaching block 12. In other words, the packets P1 and P2 have not been stored in the smoothing buffer 13 already. On the other hand, at that time, the packet P3 is not read out from the smoothing buffer 13 but is left therein does not appear in the packet string in FIG. 6C yet. In this case, therefore, only the packet P3 is discarded when the smoothing buffer 13 is cleared.

As described above in detail, according to the present invention, a packet string having variable packet intervals, which is transmitted after being converted to a packet string having even packet intervals with information for reproducing original packet intervals being attached, can be continuously transmitted without being stopped even when the bit rate becomes higher.

What is claimed is:

1. A method of transmitting a packet string with various packet intervals wherein an original packet string as said packet string with various packet intervals is transmitted from a transmitting side after being converted into a packet string with substantially fixed packet intervals comprising the steps of:

calculating a time stamp as a current time stamp for a current packet by adding a specified offset time to said current time at which said current packet has appeared;

reading out a value of the time stamp for a previous packet having been stored as a value of a previous time stamp;

comparing a value of said current time stamp with said value of said previous time stamp;

updating said value of said previous time stamp having been stored with said value of said current time stamp and attaching said current time stamp to said current packet if said value of said current time stamp is more than said value of said previous time stamp;

discarding a predetermined packet if said value of said current time stamp is not more than said value of said previous time stamp;

storing said current packet attached with said current time stamp if said current packet is not discarded;

adjusting a timing of said current packet attached with said current time stamp so that said packet forms said packet string with substantially fixed packet intervals; and transmitting said packet string with substantially fixed packet intervals.

2. A method according to claim 1, wherein said predetermined packet is said current packet.

3. A method according to claim 1, wherein said predetermined packet is previously stored packet having a larger value of time stamp than said value of said current time stamp.

4. A method according to claim 1, wherein said predetermined packet is previously stored packet except for one which is read out and being transmitted.

5. A method of transmitting and receiving a packet string with various packet intervals wherein an original packet string as said packet string with various packet intervals is transmitted from a transmitting side after being converted into a packet string with substantially fixed packet intervals and is received at a receiving side comprising the steps of:

calculating a time stamp as a current time stamp for a current packet by adding a specified offset time to said current time at which said current packet has appeared;

reading out a value of the for a previous packet having been stored as a value of a previous time stamp;

comparing a value of said current time stamp with said value of said previous time stamp;

updating said value of said previous time stamp having been stored with said value of said current time stamp and attaching said current time stamp to said current packet if said value of said current time stamp is more than said value of said previous time stamp;

discarding predetermined packet if said value of said current time stamp is not more than said value of said previous time stamp;

storing said current packet attached with said current time stamp if said current packet is not discarded;

adjusting a timing of said current packet attached with said current time stamp so that said packet forms said packet string with substantially fixed packet intervals;

transmitting said packet string with substantially fixed packet intervals;

receiving said packet string with substantially fixed packet intervals at said receiving side;

storing said packet string with substantially fixed packet intervals having been received; and reading out stored said packet string with packet intervals according to said time stamps attached to said packets thereby reproducing said original packet string with variable packet intervals.

6. A method according to claim 5, wherein said predetermined packet is said current packet.

7. A method according to claim 5, wherein said predetermined packet is previously stored packet having a larger value of time stamp than said value of said current time stamp.

8. A method according to claim 5, wherein said predetermined packet is previously stored packet except for one which is read out and being transmitted.

9. An apparatus for transmitting a packet string with various packet intervals wherein an original packet string as said packet string with various packet intervals is transmitted from a transmitting side after being converted into a packet string with substantially fixed packet intervals comprising the steps of:

- means for calculating a time stamp as a current time stamp for a current packet by adding a specified offset time to said current time at which said current packet has appeared;
- means for reading out a value of the time stamp for a previous packet having been stored as a value of a previous time stamp;
- means for comparing a value of said current time stamp with said value of said previous time stamp;
- means for updating said value of said previous time stamp having been stored with said value of said current time stamp and attaching said current time stamp to said current packet if said value of said current time stamp is more than said value of said previous time stamp;
- means for discarding a predetermined packet if said value of said current time stamp is not more than said value of said previous time stamp;
- means for storing said current packet attached with said current time stamp if said current packet is not discarded;
- means for adjusting a timing of said current packet attached with said current time stamp so that said packet forms said packet string with substantially fixed packet intervals; and
- means for transmitting said packet string with substantially fixed packet intervals.

10. An apparatus according to claim 9, wherein said predetermined packet is said current packet.

11. A method according to claim 9, wherein said predetermined packet is previously stored packet having a larger value of time stamp than said value of said current time stamp.

12. A method according to claim 9, wherein said predetermined packet is previously stored packet except for one which is read out and being transmitted.

13. A method of transmitting and receiving a packet string with various packet intervals wherein an original packet string as said packet string with various packet intervals is transmitted from a transmitting side after being converted into a packet string with substantially fixed packet intervals and is received at a receiving side comprising the steps of:

- means for calculating a time stamp as a current time stamp for said current packet by adding a specified offset time to said current time at which said current packet has appeared;
- means for reading out a value of a time stamp for a previous packet having been stored as a value of a previous time stamp;
- means for comparing a value of said current time stamp with said value of said previous time stamp;
- means for updating said value of said previous time stamp having been stored with said value of said current time stamp and attaching said current time stamp to said current packet if said value of said current time stamp is more than said value of said previous time stamp;
- means for discarding predetermined packet if said value of said current time stamp is not more than said value of said previous time stamp;
- means for storing said current packet attached with said current time stamp if said current packet is not discarded;
- means for adjusting a timing of said current packet attached with said current time stamp so that said packet forms said packet string with substantially fixed packet intervals;
- means for transmitting said packet string with substantially fixed packet intervals;
- means for receiving said packet string with substantially fixed packet intervals at said receiving side;
- means for storing said packet string with substantially fixed packet intervals having been received; and
- means for reading out stored said packet string with packet intervals according to said time stamps attached to said packets thereby reproducing said original packet string with variable packet intervals.

14. An apparatus according to claim 13, wherein said predetermined packet is said current packet.

15. A method according to claim 13, wherein said predetermined packet is previously stored packet having a larger value of time stamp than said value of said current time stamp.

16. A method according to claim 13, wherein said predetermined packet is previously stored packet except for one which is read out and being transmitted.

* * * * *